United States Patent [19]
Watson

[11] 3,931,460
[45] Jan. 6, 1976

[54] VIDEO DISC WITH MULTITURN UNDULATING STORAGE TRACK

[75] Inventor: William H. Watson, Schaumburg, Ill.

[73] Assignee: Zenith Radio Corporation, Chicago, Ill.

[22] Filed: Feb. 4, 1974

[21] Appl. No.: 439,681

[52] U.S. Cl.. 178/6.6 A; 178/6.6 DD; 179/100.3 V; 179/100.3 G
[51] Int. Cl.² ... G11B 7/24; H04N 1/00; H04N 3/02
[58] Field of Search...179/100.3 G, 100.3 V, 100.3 B, 179/100.4 A, 100.4 C; 178/6.7 A, 6.6 A, 6.6 DD; 250/201, 202, 203

[56] References Cited
UNITED STATES PATENTS

| 1,917,003 | 7/1933 | Williams | 179/100.3 V |
| 3,673,412 | 6/1972 | Olson | 179/100.3 V |
| 3,798,388 | 3/1974 | Dickopp | 179/100.3 V |

OTHER PUBLICATIONS

Eduology, Vol. 4, Issue 1, 1973, On Printing Motion by P. Kramer and K. Compaan.

Primary Examiner—James W. Moffitt
Assistant Examiner—Stewart Levy
Attorney, Agent, or Firm—Cornelius J. O'Connor

[57] ABSTRACT

A video disc has a storage track formed of half wavelength pits alternating with lands. The track has a series of turns, individually of a generally circular path but undulating symmetrically about that path. The undulations of the several turns have such relative phase that the turns are in nested concentric relation and one component of the stored information represents the phase of the undulations.

The record is a replication of a master formed under the control of a laser writing beam modulated with the information to be stored. A Bragg cell in the optical path, responding to a cyclic frequency-modulated signal, optically displaces the writing beam about a reference path to develop undulations in the record storage track.

2 Claims, 4 Drawing Figures

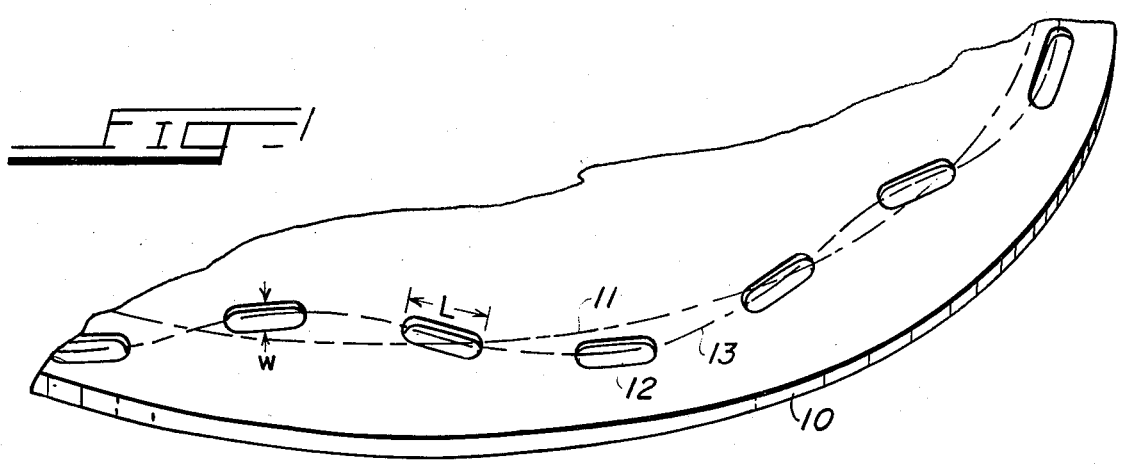
FIG-1
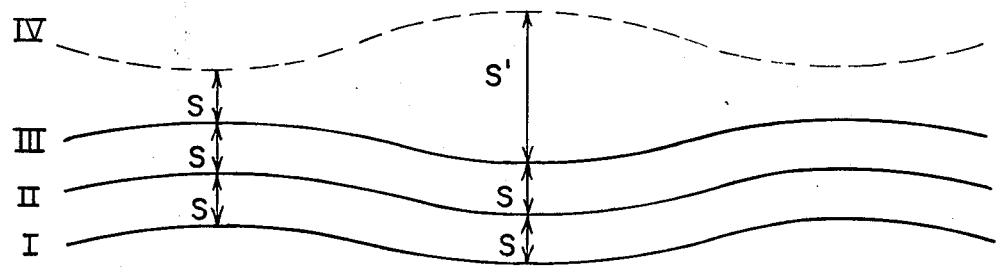
FIG-2
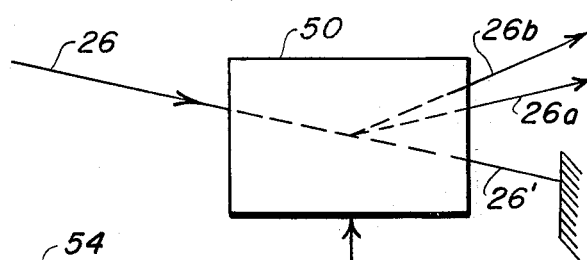
FIG-4
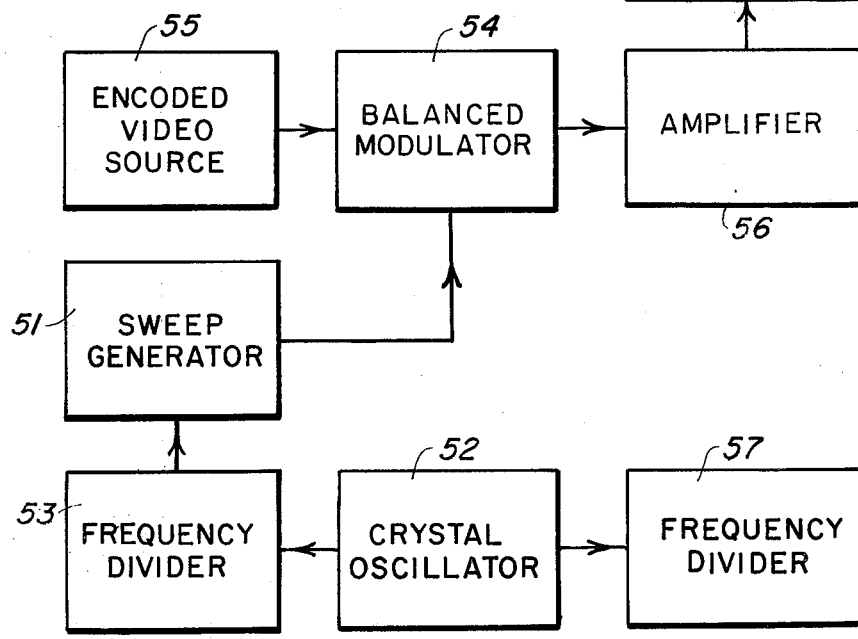

VIDEO DISC WITH MULTITURN UNDULATING STORAGE TRACK

RELATED PATENT APPLICATIONS

Concurrently filed applications Ser. Nos. 439,683, now abandoned and 439,682 are related to the subject invention. Application Ser. No. 439,683 has been replaced by a continuation-in-part application Ser. No. 544,250, filed Jan. 27, 1975. The Adler continuation-in-part application concerns radial tracking in a video disc player employing periodic relative displacement of the record track and reading beam and shows specifically an embodiment in which the reading beam is periodically deflected. The Whitman application concerns an alternative approach in which similar results are realized by undulations of the storage track. The present disclosure is a further refinement, having to do with concentricity of the several convolutions of a storage track which has wobbulations for tracking purposes. The subject improvement enhances storage density of the disc.

SUMMARY OF THE INVENTION

The present invention is addressed to a record disc in which information is stored in a track to be read by a reading beam of energy, such as collimated light from a laser source. One application of such a disc of timely interest is for storing video programs. Such a video disc may be read to develop an electrical signal for energizing a color television receiver to enhance the use of such an instrument.

Information may be stored in a variety of ways in a video disc, for example, by incremental segments of variable transmissivity as in photographic negative techniques or by forming a succession of pits and lands of uniform width but variable length along the storage track to constitute a spatial representation of the temporal variations of a carrier signal used in preparing the disc and frequency modulated with the information to be stored. It is known that the depth dimension of the pits may be a quarter wavelength of the reading beam in the disc medium or, alternatively, it may be a half wavelength. As used herein, the expression "quarter wavelength pit" is intended to describe the case wherein the pit depth causes a phase difference of approximately one-fourth wavelength between portions of the reading beam entering the pits and portions entering adjacent lands. Similarly, "half wavelength pit" is intended to describe the case wherein the pit depth causes the phase difference to be approximately one-half wavelength. Of course, the disc may be transmissive or reflective to the reading beam, the only difference being that the pit depth is reduced about one-half for the reflective case.

The half wavelength disc, prior to the Adler invention, required complicated arrangements in the disc playback apparatus for achieving radial tracking. Like the Adler and Whitman inventions, the present development has application to a variety of disc structures but, for convenience, will be specifically disclosed in the environment of a transmissive disc having half wave pits and arranged to simplify radial tracking of the reading beam.

It is a specific object of the invention to arrange for improved tracking in reading a record disc, such as that employed for storing a video program.

It is another object of the invention to improve the implementation of the tracking concept of the above-identified Adler application to simplify the structure of the readout or playback apparatus.

It is a very particular object of the invention to provide a video record disc having a novel storage track comprising half wave pits which simplifies radial beam tracking in the readout apparatus and has a high storage density.

A record disc, according to the invention, is comprised of a storage medium with information stored in a track having a series of convolutions individually of a generally circular mean path to be read by a beam of energy. Each convolution of the track has periodic undulations disposed symmetrically with respect to its mean path and the undulations of all convolutions of the track have such relative phase that the convolutions are in nested concentric relation with a substantially uniform spacing with respect to one another. The record is further characterized by the fact that the phase of the undulations is represented by a component of the stored information.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements, and in which:

FIG. 1 is a schematic representation of a fragment of a video disc constructed in accordance with the invention, schematic in that it is not drawn to scale;

FIG. 2 is a set of curves used in discussing packing density of video discs;

FIG. 4 represents a modified arrangement for wobbling the writing beam while preparing a master recording.

DESCRIPTION OF PREFERRED EMBODIMENTS

Figure 3:
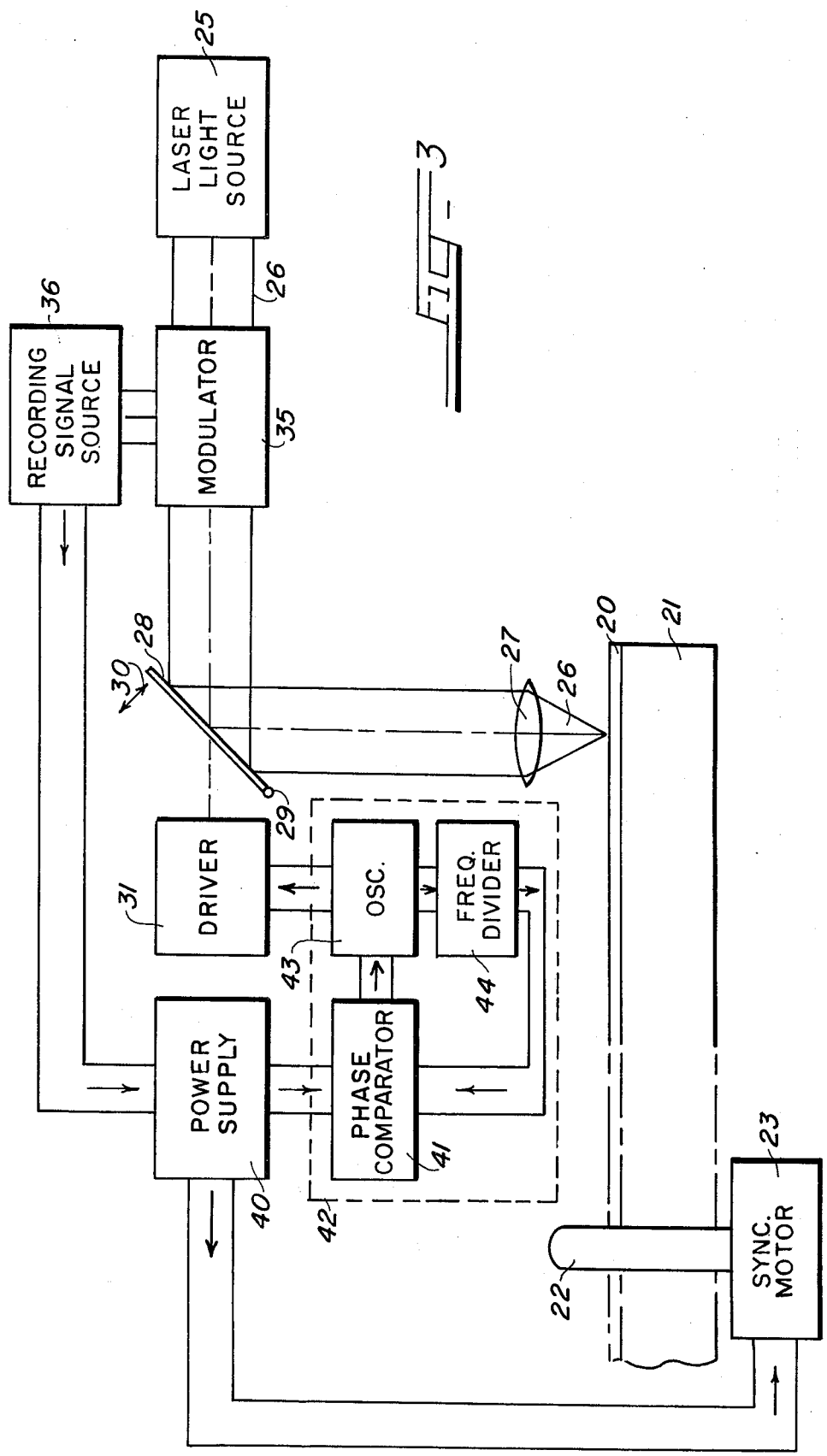
FIG. 3 is a schematic representation of a mastering system through which a disc of the type shown in FIG. 1 may be prepared.

Referring now more particularly to FIG. 1, the disc 10 there represented is formed of a medium having the capability of storing information, such as polyvinyl chloride which may store information in a manner generally similar to an audio record disc. Disc 10 may be sufficiently thin to be rotated at a high speed in a technique known as flying a disc for reading purposes or it may be sufficiently thick to be mechanically rigid like an audio record to be rotated on a turntable for readout purposes. The disc has information stored in the form of a continuous multiturn, spiral-shaped track each turn of which has a generally circular mean path represented by dash-dot construction line 11 and which is to be read by a beam of energy, such as a laser, to derive the stored information. Each turn of the track is made up of a series of pits 12 and lands 13 which alternate along the path and collectively constitute the storage track. As will be observed in FIG. 1, this track is characterized by having periodic undulations disposed symmetrically with respect to path 11 so that in the playback of the disc by apparatus similar to that disclosed in the Adler application, radial tracking correction may be accomplished without requiring periodic displacement of the reading beam. The playback device is no part of the present invention and, aside from the beam wobbling arrangement which is not required in playing back records described and claimed herein, may be the same as disclosed in the Adler application which is incorporated herein by reference.

While each turn of the storage track has undulations as described, the relative phase of such undulations in the various turns has a distinct bearing on the packing density or storage capacity of the disc. This is demonstrated by the curves of FIG. 2 which represent segments of the storage track. If curves I, II, III are inscribed as corresponding segments of three consecutive turns of the track, it will be seen that the relative phase of their undulations is such that the turns are in nested concentric relation with a uniform spacing S with respect to one another. This is a condition of maximum storage capacity for a disc with undulations in its track and is to be contrasted with another phase condition for which the disc exhibits minimum storage capacity, namely, that illustrated by curves III and IV. With the undulations of consecutive turns phased as illustrated by these curves, the interturn separation varies from a minimum S to a maximum S'. Obviously, the storage density has been materially decreased compared with the first-described conditions which are to be employed in practicing the present invention.

In preparing video discs of the type under consideration, a master is formed having the general arrangement of FIG. 1 and is used in a replicating process by which copies, having essentially the same storage track, are produced for distribution to users who have appropriate playback apparatus. Where the program information stored in the disc is intended to be reproduced through a color television receiver, it is common practice to prepare the master, and hence the replicated copies, under the control of an angular-velocity (frequency) modulated carrier signal which has been modulated to convey luminance, chroma, audio and synchronizing information. In the pit and land storage technique the pits have a common width w but the length l of a pit and the length of its companion land are determined along the track to be a spatial representation of the temporal variations of the modulated carrier signal that has been recorded. The reading beam for deriving stored information from such a track has a width or cross sectional diameter approximately equal to the width w of a pit and the peak-to-peak excursions of the track undulations are substantially equal to the spot diameter. That is sufficient for radial tracking purposes and minimizes the specifications of the recording system by requiring a capability of only two resolvable points in the process which establishes the record storage track. The frequency of the undulations is not critical although, as explained in the Adler application, it should be high compared with the frequency range necessary for the feedback or servo mechanism typically employed to accomplish radial beam tracking. An undulation frequency of 100 to 200 KHz is adequate and, accordingly, the frequency of the undulations is relatively small compared to the mean frequency of the recorded carrier which is usually 6 to 6.5 MHz.

Video discs of the type under consideration are, as indicated above, replicas of a master which may be prepared through a mechanical cutting process as customary in the preparation of audio discs or by scribing a photosensitive layer with a modulated laser beam.

Where it is desirable to impose undulations on the record track, as described in conjunction with FIG. 1, it is convenient to employ laser scribing which may be done in a system of the type shown schematically in FIG. 3. The master is a glass disc or plate 20 which has its top or exposed surface coated with a sensitized photoresist material, such as polyvinyl alcohol, to a depth corresponding to the depth dimension desired for the pits of the track; for the assumed case of a transmissive disc, that is a depth of one-half wavelength of the reading beam in the medium of the replicated video disc which is usually polyvinyl chloride. The resist coated disc is centrally apertured and is supported on a turntable 21 having a disc-positioning spindle 22 and driven by a synchronous driving motor 23. It will be assumed that the photoresist coating of master 20 is of the negative type, that is to say, a resist having the property that it is rendered insoluble in a solvent, such as water, upon exposure to actinic energy. Selective exposure of elemental segments of the disc is under the control of a laser light source 25 which may be of the argonion, helium cadmium or helium neon type directing a writing beam 26 along an optical path to a focus lens 27 which focuses the writing beam on the coated surface of the master. A mirror 28 displaceable about a pivot 29 as indicated by arrow 30 is included in the optical path and may be periodically oscillated by a driver 31 to displace the reading beam cyclically in order to create undulations in the storage track of the record under preparation. Of course, the writing beam must carry the information to be stored and for that purpose it is delivered to a modulator 35 which also receives from a recording signal source 36 a frequency modulated carrier signal, modulated with luminance, chroma, audio and synchronizing signals which constitute the usual video program signal. It has been found convenient to give frequency assignments to the luminance, chroma, audio and synchronizing information that are specifically different from commercial broadcast practices but that is of no moment to the present invention.

The modulator in response to the modulated carrier signal from source 36, in effect, chops or interrupts the laser beam to achieve an on-off duty cycle of approximately 50 per cent at a repetition rate that reflects the instantaneous frequency of the signal being stored. If displacement of mirror 28 be neglected temporarily, the described arrangement will be recognized as a known form of laser mastering system which forms a continuous generally spiral-shaped storage track in the coating of master 20 comprised of half wave pits alternating with lands in a spatial arrangement reflecting the temporal variations of the frequency-modulated carrier signal which controls scribing of the master. It is customary that a single convolution of the record track constitute the two interlaced fields that define a single image frame in accordance with present television broadcasting techniques.

The mastering process is modified in accordance with the teachings of the present invention to impose an undulatory pattern to the record track so that it is sinuous rather than being the smooth circular path typical, for example, of audio or prior art video recordings. To achieve this result, driver 31 oscillates mirror 28 and displaces writing beam 26 symmetrically with respect to the mean path it would otherwise take were mirror 28 fixed. The displacement frequency during playback of the disc, as already mentioned, is in the neighborhood of 100 to 200 KHz and the peak-to-peak displacement is about equal to the cross sectional diameter (usually 1 micrometer) of the reading beam to be employed in deriving the stored information of a disc replicated from master 20.

In order to implement the subject invention and establish the phase relationship described above in discussing curves I, II and III of FIG. 2, the wobble frequency of writing beam 26 is to be related to the rotation of the turntable so that at any given radial position on the disc, the phase of the wobble displacement is the same on all convolutions of the storage track. This may be accomplished by phase locking an oscillator 43 that energizes driver 31 to a frequency multiple of the disc rotation. As shown in FIG. 3, synchronous motor 23 is controlled by a power supply 40 synchronized, for example, to the 60 Hz field rate of source 36. Power supply 40 also supplies a phase reference signal to a phase comparator 41 of a phase lock loop 42 shown by a broken-line rectangle. Phase comparator 41 also receives the output of oscillator 43 for phase comparison but after the oscillator output has been suitably reduced in frequency by means of a divider 44. A phase correction voltage developed in phase comparator 41 controls the phase of the energizing signal supplied by oscillator 43 to driver 31 to the end that the periodic displacement of writing beam 26 by mirror 28 is in phase with the rotation of turntable 21. In this manner, the phase conditions described in the discussion of curves I, II and III of FIG. 2 are established and maintained.

It is necessary that the video disc convey a phase reference that represents the phase of the undulations of the track so that a synchronous detector, employed as described in the Adler application, is able to develop a radial tracking correction signal in the reading of the disc. While a separate phase reference or pilot signal could be included in the stored information, this is not necessary when the recording is of a video program because such program material customarily has timing information in the form of sync pulses. Where a synchronizing signal component from source 36 is used as a phase reference as described and is included in the information stored in the video disc, a local oscillator in the readout apparatus may likewise respond to the sync pulses derived from reading the disc to develop the phase reference signal to be supplied to the synchronous detector of the radial tracking system.

Driver 31 may take a variety of forms depending upon the transcribing speed at which the master is prepared. For example, the recording is oftentimes prepared at a speed of 54 times down from real time in which case the displacement or undulation frequency during the processing of the master record is the desired 100 to 200 KHz divided by 54. In such a case, it is a sufficiently low frequency that electromechanical motors such as a galvanometer mirror may be used to oscillate mirror 28. Alternatively, mirror 28 may be supported at the free end of a cantilever mounted piezoelectric bender or bimorph of the type described and claimed in the copending application, Ser. No. 439,684 of Robert Adler and Adrian Korpel, now abandoned. Energization of such a bimorph under control of a signal from a sine-wave oscillator synchronized by the horizontal sync pulses from source 36 may accomplish the desired periodic displacement of writing beam 26. This is especially true since the peak-to-peak displacement is small, being only approximately equal to the cross sectional diameter of the reading beam which is usually of the order of 1.0 micrometer. Displacement of that magnitude is easily accomplished by a mirror supported at the free end of a cantilever of the type mentioned. Sometimes it is desirable to record in real time in which case mirror 28 will have to be oscillated at the displacement or undulation frequency of the playback device. Other beam-displacement devices may be used for that purpose. For example, an acousto-optic element of the longitudinal or flexural-mode type may be used to control a diffraction grating in the optical path in order to deflect the beam periodically. Suitable forms of acousto-optic devices are described in the Adler application.

Another type of beam deflector for wobbling writing beam 26, featuring the use of an acousto-optic (Bragg) cell 50, is shown schematically in FIG. 4. As is well understood, a beam of collimated light may be directed to enter a Bragg cell of water, crystal or glass at the Bragg angle to encounter a diffraction grating resulting from directing an ultrasonic signal transversely of the cell and the path of the light beam. As a consequence of the interaction between the light beam and the diffraction grating, a zero-order component 26' emerges from the cell as an undeflected component of the entering light beam 26 and, at the same time, a first order component 26a of the beam emerges displaced from component 26' by an amount determined by the wavelength of the ultrasonic signal supplied to cell 50. By adjusting (increasing) the wavelength of the ultrasonic signal, the first-order component may appear as represented at 26b, spaced from position 26a by an amount corresponding to the peak-to-peak angular displacement desired for writing beam 26, usually about 0.14 milliradians. Varying the frequency or wavelength of the ultrasonic signal over this range and at a preselected wobble frequency accomplishes wobbulation of the writing beam as required in preparing the master recording. Accordingly, the light beam is both modulated and deflected in cell 50 and the first-order component is used to inscribe the master. The zero-order component 26' is masked out as indicated.

A carrier signal to be modulated and supplied to cell 50 is developed in a sweep generator 51 by which is meant a voltage-controlled generator that is responsive to a periodic control signal to sweep the carrier frequency back and forth across a predetermined frequency range. Illustratively, the frequency range may be 35 to 45 MHz with a mean value of 40 MHz. The sweep control voltage is delivered by a crystal controlled oscillator 52, which illustratively may have an operating frequency of 3.58 MHz, through a frequency divider 53 which steps the frequency down to 3.58 KHz, for example. For the assumed frequencies, the operating frequency of generator 51 sweeps across its range at a wobble frequency of 3.58 KHz. This is predicated on a recording speed of 54 times down and corresponds to a track wobble frequency of 193.32 KHz during playback of the replicated video disc.

The variable-frequency carrier from generator 51 is delivered to a double balanced amplitude modulation modulator 54 which also receives the encoded video signal from source 55 for recording on the disc. Encoding is simply a signal processing which arranges the luminance, chroma, audio and synchronizing components in assigned portions of the frequency spectrum convenient for recording but of no consequence to the present invention. The output of modulator 54 is applied to acousto-optic cell 50 through an amplifier 56. Thus, the signal reacting with the light beam in cell 50 is, in effect, doubly modulated. Its carrier has been subjected to a cyclic variation at the wobble frequency rate under the control of crystal oscillator 52. At the same time, it has been chopped or amplitude modulated to have a 50 per cent duty cycle under the control of the encoded video signal. Both modulations are manifest in the output from cell 50 used to inscribe the master 20. That output is the first-order component which is periodically swept between positions 26a and 26b at the wobble rate of 3.58 KHz. It concurrently conveys the program information under the control of the encoded video signal and stores that information in the disc. While the system has been described for recording at 54 times down, it may also be used to record in real time.

The desired phase relation of the undulations in the several convolutions of the storage track formed on disc 20 is ensured by deriving a properly phased energizing signal for motor 23 from crystal oscillator 52 through a second frequency divider 57 having an appropriate division ratio.

After writing beam 26 has scanned master 20 under the conjoint control of the information bearing carrier signal and the periodic displacement at the wobble frequency, the resulting record track is developed by rinsing the master with a solvent. In that process the unexposed track segments wash away and form the pit components of the storage track, whereas the exposed segments remain and serve as the lands which separate successive pits. Of course, a positive type resist may be used if desired. Such a resist becomes soluble in a solvent in response to exposure and, then, the exposed portions of the disc become pits of the storage track. The developed master is then coated with silver or other suitable conductive material. The purpose of this coating is to facilitate the deposition of nickel over the record to a thickness sufficient that the master may serve as a stamper.

Plastic sheets which are to be formed as video discs in replicating the master are brought against the stamper and heated under pressure. Representative values of operating parameters include a pressure of 500 pounds per square inch and a temperature of 180° C. This prints the record track or transfers it to the plastic sheet which is then rapidly cooled while remaining in contact with the dye or stamper. After cooling, the replicated disc is separated from the stamper and is ready for use.

While a particular embodiment of the present invention has been shown and described, it will be obvious to those skilled in the art that various changes and modifications may be made without departing from the invention in its broader aspects. Accordingly, the aim in the appended claims is to cover all such changes and modifications that may fall within the true spirit and scope of the invention.

What is claimed is:

1. A record disc comprised of a storage medium having information stored in a variable-depth track which comprises a series of convolutions individually having a generally circular mean path to be read by a beam of energy and characterized by the fact that each track convolution has periodic fixed-amplitude lateral undulations disposed symmetrically with respect to its mean path, the undulations of said series of convolutions having such relative phase that said convolutions are in nested concentric relation with a substantially uniform spacing with respect to one another, and further characterized by the fact that the phase of said undulations is correlated with that of a component of the stored information.

2. A record disc in accordance with claim 1 in which the storage track is comprised of pits and lands in alternation, and in which the depth dimension of said pits introduces a phase change of one-half wavelength between portions of the reading beam that impinge upon said pits and portions that impinge upon adjacent lands.

* * * * *

Notice of Adverse Decision in Interference

In Interference No. 99,406, involving Patent No. 3,931,460, W. H. Watson, VIDEO DISC WITH MULTITURN UNDULATING STORAGE TRACK, final judgment adverse to the patentee was rendered Jan. 3, 1977, as to claim 1.

[*Official Gazette May 3, 1977.*]